United States Patent [19]

Cadic

[11] Patent Number: 4,484,492
[45] Date of Patent: Nov. 27, 1984

[54] DEVICES FOR SELECTIVELY COUPLING TO A SHAFT TO BE DRIVEN TWO SEPARATE DRIVING MEMBERS

[75] Inventor: Raymond Cadic, Cherbourg, France

[73] Assignee: Societe d'Exploitation des Procedes Felix Amiot, Paris, France

[21] Appl. No.: 354,201

[22] Filed: Mar. 3, 1982

[30] Foreign Application Priority Data

Mar. 13, 1981 [FR] France ................. 81 05102

[51] Int. Cl.³ .................. F16H 37/06; B63H 1/06
[52] U.S. Cl. ...................... 74/625; 74/670; 416/162
[58] Field of Search ........... 416/165, 155, 162; 74/625, 665 A, 665 B, 665 E, 670; 192/94, 97

[56] References Cited

U.S. PATENT DOCUMENTS

| | | | |
|---|---|---|---|
| 754,757 | 3/1904 | Ellicott et al. | 74/625 |
| 2,286,597 | 6/1942 | Bruckel et al. | 74/625 |
| 2,664,765 | 1/1954 | Kelbel | 74/655 |
| 3,651,907 | 3/1972 | Myer | 192/94 |
| 3,833,314 | 9/1974 | Amiot | 416/164 |
| 3,869,221 | 3/1975 | Wildner | 416/162 |
| 3,915,270 | 10/1975 | Miller | 192/94 |
| 4,130,030 | 12/1978 | Stratienko | 74/625 |

FOREIGN PATENT DOCUMENTS

| | | | |
|---|---|---|---|
| 547880 | 10/1957 | Canada | 74/625 |
| 624677 | 8/1961 | Canada | 416/163 |
| 350257 | 4/1937 | Italy | 416/155 |
| 603231 | 5/1948 | United Kingdom . | |
| 860205 | 2/1961 | United Kingdom | 416/163 |
| 1493294 | 11/1977 | United Kingdom . | |
| 2087505 | 5/1982 | United Kingdom | 74/625 |
| 2094924 | 9/1982 | United Kingdom | 74/625 |
| 838154 | 6/1981 | U.S.S.R. | 192/94 |

Primary Examiner—Leslie A. Braun
Assistant Examiner—Michael J. Gonet
Attorney, Agent, or Firm—Parmelee, Bollinger & Bramblett

[57] ABSTRACT

Means are provided for coupling at will a driven shaft (2), intended more particularly for adjusting the orientation of the blades of a boat propellor, either to the output shaft (1) of a motor or to a hand operable member (3). To this end there are provided three coaxial inwardly splined ring-wheels juxtaposed axially and integral respectively, the first two (13,14) with the two shafts and the third one (16) with said member, an outwardly splined hub (15), a tangent wheel (22) integral with said member and coacting with an endless screw (23) operable by means of a crank and screw means actuated by the rotation of a crank mounted on a head (28) and arranged so as to control the axial sliding of the hub by means of thrust bearings (32) and springs (33).

8 Claims, 1 Drawing Figure

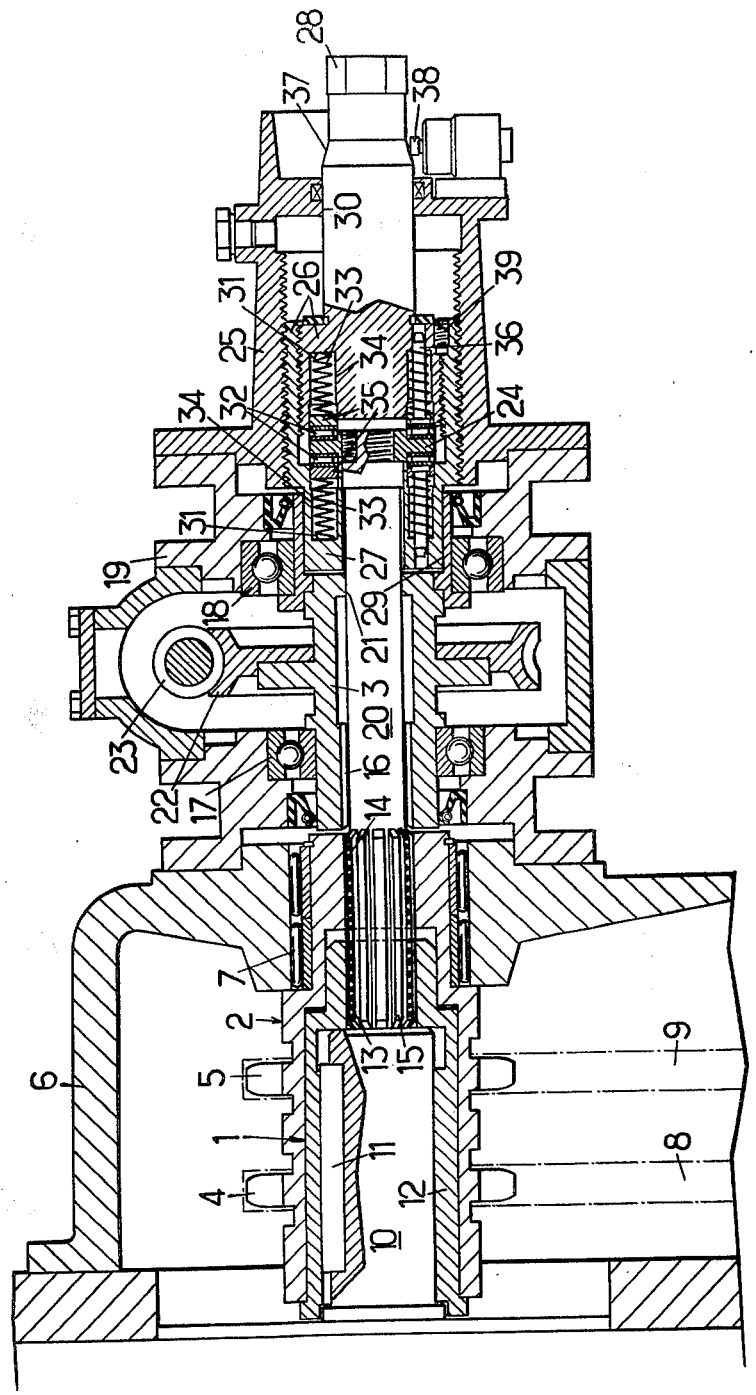

DEVICES FOR SELECTIVELY COUPLING TO A SHAFT TO BE DRIVEN TWO SEPARATE DRIVING MEMBERS

The invention relates to devices for selectively coupling to a shaft to be driven two separate driving members, one of which is the output shaft of a motor and the other of which is an operating member able to be hand operated such as a crank or handwheel.

Permutation of the two modes of driving the driven shaft, which these selective coupling devices make possible, forms an emergency measure making up for possible failure of the motor.

The invention relates more particularly, among these selective coupling devices, to those in which the driven shaft is rotatably connected to a kinematic chain for controlling with safety irreversible movements.

It aims more particularly still—because it is in their case that its application seems to offer the greatest interest—, but not exclusively, among the devices of the kind in question, to those in which the kinematic chain serves for adjusting the orientation of the blades of a boat propellor by controlling the relative axial movements of a bar coupled to these blades and housed in the hollow drive shaft of this propellor, these axial movements being themselves linked to those of an assembly movable along threaded rods which are secured against movement axially and rotatably linked to the above driven shaft, more especially through gear wheel-chain assemblies, in accordance with the teachings of U.S. Pat. No. 3,833,314.

For the constructive aspect, the invention relates more especially to those of the selective coupling devices considered which comprise two coaxial inwardly splined ring-gears, axially contiguous and integral, respectively, the first one with the output shaft of the motor and the second one with the shaft to be driven, an externally splined hub capable of coacting with the two splined ring-wheels and means adapted to move this hub axially, which always remains engaged with the second ring-wheel, so as to couple it to the first ring-wheel or on the contrary to uncouple it therefrom.

In known embodiments, of these latter devices, the axial movements of the splined hub are directly controlled by hand and the manual operating member is no other than a crank able to be fitted directly on a square section extension of said hub, when this latter is in its axial position in which it is uncoupled from the first ring-wheel.

The force required for controlling not only the axial sliding of the hub but also rotation thereof in the "uncoupled position" is relatively high, which makes arduous the emergency operations which are however the reason for the existence of the selective coupling devices considered.

This disadvantage may be particularly troublesome for the preferred application mentioned above, more especially when the emergency operations for adjusting the orientation of the blades of the boat must be carried out and frequently renewed in heavy weather.

Furthermore, and still for the same preferred application, the relative reversibility of the manual control may pose certain problems, in particular because the contacts at the level of the threaded rods are preferably provided with bearings.

The invention has especially as its aim to remedy the above disadvantages by making the manual operations easier relative not only to the permutation of the coupling mode but also to driving the driven shaft, while conferring on this latter drive a total irreversibility.

To this end, the selective coupling devices of the above kind in accordance with the invention are essentially characterized in that they comprise a third inwardly splined ring-wheel similar to the first two ring-wheels, rotatably mounted in a frame in a position axially contiguous to the second ring-wheel, on the side thereof opposite the first ring-wheel, a tangent wheel integral with this third ring-wheel, an endless screw coacting with the tangent wheel and actuatable by a first manual rotary control member, and screw means for controlling, from a second rotary manual control member, the axial sliding of the splined hub so as to cause it to coact either with the first ring-wheel, or with the third one.

In preferred embodiments, recourse is had further to one and/or the other of the following arrangements:

the screw means for controlling the axial sliding of the hub comprise an inwardly threaded sleeve integral with the frame, an externally threaded part coacting with this sleeve and ending on the outside of the frame in a head adapted to receive rotary manual forces, and means for making the threaded part integral axially, but not angularly, with the hub, the means for making the externally threaded part integral axially, but not angularly, with the hub, comprise a transverse collar integral with this hub and a case extending said externally threaded part and able therewith to envelop the collar with a clearance radially and without clearance in the axial direction, preferably with axial interpositioning of thrust bearings, resilient means are interposed axially between the axially facing transverse bearing surfaces embraced respectively by the collar and the parts which envelop it, and more especially between each thrust bearing and one of the two bearing surfaces which axially surround this thrust bearing if such a thrust bearing is provided, the resilient means are formed by a ring of helical compression springs housed in appropriate pockets, the threaded part comprises a truncated cone shaped annular ramp or similar adapted to coact, during the axial movements of this part, with a micro-switch mounted in an electric circuit itself associated with safety means adapted to neutralize the motor as long as the hub is not in its axial position corresponding to total coupling thereof with the output shaft of this motor.

The invention comprises, apart from these principal arrangements, certain other arrangements which are used preferably at the same time and which will be more explicitly discussed hereafter.

In what follows, a preferred embodiment of the invention will be described with reference to the accompanying drawing in a way which is of course in no way limiting.

The single FIGURE of the drawing shows in axial section a selective coupling device constructed in accordance with the invention.

It is a question of coupling at will a shaft to be driven 2 either to the output shaft 1 of a motor or to another rotary member 3 rotatable by hand for making up for possible failures of the motor.

In the preferred application considered here, the shaft to be driven 2 is in the form of a sleeve integral with two gear wheels 4 and 5, which sleeve is pivotably mounted on the frame 6 of the motor by means of appropriate bearings 7.

The gear wheels 4 and 5 coact with chains 8 and 9 so as to rotate two parallel threaded rods secured against axial movement and disposed on each side of the hollow drive shaft of a boat propellor for axially moving a bar disposed along the axis of this shaft, said bar being coupled to the roots of the blades of the propeller so as to be able to adjust the orientations of these blades: for this purpose, a nut and thrust bearing assembly is provided mounted on the threaded rods so as to be able to move axially, but not angularly, and integral axially, but not angularly, with the bar.

Such an assembly has been described in the above-mentioned patent.

The portion of the drive shaft 1 which is coupled to sleeve 2 is itself in the form of an end-piece 10 on to which is fitted angularly, by means of a key 11, a socket 12 housed with an easy fit in said sleeve.

Socket 12 and sleeve 2 both comprise axial extensions cut away respectively to form two inwardly splined ring-wheels 13 and 14. These ring-wheels are practically identical and juxtaposed axially with a slight clearance.

Their mutual coupling in rotation is provided by means of a hub 15 externally splined correspondingly and mounted axially slidable.

This hub 15 comprises constantly a portion of its splines engaged with the second ring-wheel 14, but depending on its axial position its splines are:

either partially engaged in the first ring-wheel 13, which ensures angular coupling of the drive shaft 1 and the shaft to be driven 2, or totally disengaged from this first ring-wheel 13, which ensures the mutual uncoupling between the two shafts 1 and 2.

To control the coupling and uncoupling between these two shafts 1 and 2, it is sufficient then to cause the splined hub 15 to slide axially.

For the uncoupled state of the mechanism, it is advisable to provide means for driving shaft 2 by hand or, which comes to the same thing, hub 15, which remains constantly rotatably coupled to this shaft.

The invention relates essentially to the means for driving this hub 15, not only axially to ensure the above coupling and uncoupling, but also angularly to provide emergency manual control of the shaft to be driven.

Member 3 comprises to this end a third inwardly splined ring-wheel 16, identical to the other two 13 and 14 and juxtaposed axially to the second ring-wheel 14 on the side thereof opposite the first ring-wheel 13.

The axial length of the external splines of hub 15 is substantially equal to twice the axial length of a splined ring-wheel (13,14 or 16).

An axial half of these external splines is constantly engaged with the second splined ring-wheel or central splined ring-wheel 14, and the second axial half of these splines is, depending on the axial position of said hub 15, either totally engaged in the first ring-wheel 13 (left-most position in the FIGURE), or totally engaged in the third ring-wheel 16 (right-most position in the FIGURE), or partially engaged at one and the same time in each of the two ring-wheels 13 and 16.

The first case corresponds to the previously described coupling between shafts 1 and 2, the second case corresponds to coupling between member 3 and shaft 2 and the third case corresponds to the intermediate operating phases.

Member 3, which comprises the third splined ring-wheel 16, is pivotably mounted, by means of ball bearings 17 and 18, in an auxiliary frame 19 fixed to frame 6, more especially by screwing.

This member 3 is in the general form of a cylindrical jacket through which passes axially from one end to the other an axial extension 20 of the splined hub 15, which extension is jointingly guided in a bored end 21, of said jacket, opposite ring-wheel 16.

The jacket in question forms a hub for an outer tangent wheel 22.

An endless screw 23 cooperating with this tangent wheel is rotatably mounted on frame 19 and ends on the outside of this frame in a manual control member M (not shown) such as a crank or a hand-wheel.

This endless screw 23 and tangent weel 22 mounting provides a geared down and irreversible manual control of the rotation of member 3 and so of driven shaft 2 when hub 15 is in its rightmost position in the FIGURE.

The control of the axial movements of hub 15 is provided by screwing, using means for transforming into these axial movements the rotation of a second rotary manual control member N (not shown), which may moreover be the same as the first member M if this latter is provided easily removable from its shaft, since the two controls concerned are not simultaneous.

To this end:

there is provided at the end of extension 20 a transverse collar 24 defined axially by two flat annular bearing surfaces, there is secured to frame 19, more especially by bolting, an inwardly threaded sleeve, coaxial with hub 15, and there is mounted in this sleeve a correspondingly outwardly threaded part 26 which is extended at one of its axial ends by a case 27 adapted to span with this part collar 24 so as to be integral axially, but not angularly, with this collar and at its other axial end by an external head 28 adapted to receive manual rotational forces.

In practice, the assembly of externally threaded part 26 and case 27 is advantageously formed:

on the one hand by a cylindrical end-piece whose enlarged base is defined externally by a threaded cylindrical surface, and on the other hand by a socket having an inwardly and outwardly threaded cylindrical neck, this neck being screwed about the above enlarged base and being fixed angularly to this base by means of a small excentric screw 39, the external thread adapted to cooperate with inwardly threaded sleeve 25 being then that of said neck.

The transverse collar 24 may be formed by a projecting disk or plate screwed axially to the end of the extension 20.

Outwardly threaded part 26 is guided transversely by the jointing housing of two cylindrical areas which it comprises in complementary bores 29, 30 of frame 19 and of sleeve 25.

The assembly 26–27 comprises two transverse bearing surfaces 31 adapted to axially surround collar 24 by means of two thrust bearings 32, more particularly needle bearings.

Head 28 is here defined outwardly by a hexagonal prism adapted to be covered by member N hollowed out correspondingly.

Thus, each rotation of this member N results in axial sliding of hub 15 in a direction which depends on the direction of said rotation.

In fact, this rotation may cause threaded part 26 to rotate in fixed sleeve 25, which moves it axially, as well as case 27 which is integral therewith, collar 24 axially surrounded by this case and by this part and hub 15 whose extension 20 ends in this collar.

To permute the two coupling modes of the shaft to be driven 2 with respectively the shaft of motor 1 and member 3, it is then sufficient to cause member N to rotate in one direction or in the other.

According to a particularly interesting improvement of the invention, resilient means are inserted between each thrust bearing 32 and the corresponding bearing surface 31.

In the embodiment illustrated, these resilient means are formed by a ring of small helical compression springs 32, for example 9 in number, housed in as many pockets 34 having parallel axes.

To distribute the forces of these springs 33 on the corresponding thrust bearing 32, there is inserted therebetween a washer 35 and so as to avoid rotation of this washer there is provided thereon at least one guide stud 36 adapted to coact with the correspondingly bored bottom of a pocket 34.

The advantage of this improvement resides in that it facilitates the beginning of axial introduction of the external splines of hub 15 in the corresponding internal splines of ring-wheel 13 or 16 during each operation.

If, in fact, the angular positions of the two splines to be introduced, one into the other, do not present the exact stagger required, their relative introduction requires premature mutual angular adjustment, which is difficult to achieve because of the very fact that the introduction is not yet begun: the result is the risk of wear of the axial ends of the splines in mutual contact.

On the contrary, the above improvement allows the axial movement of the threaded part to begin even if no mutual axial introduction of the splines is possible, which results simply in compression of one of the sets of springs 33, which compression resiliently urges the splines considered in mutual axial contact.

Therefore, the subsequent mutual angular adjustment of these splines results, as soon as their correct angular position is ensured, in a resilient relaxation axially introducing the two splines quite cleanly one into the other.

With this arrangement, the wear of the extreme ends of the splines is then reduced while facilitating the beginning of each operation.

In addition, it is advisable for shaft 1 of the motor to be immobilized as long as hub 15 is in an axial position other than its leftmost position in the FIGURE: it is in fact not possible to cause member 3 to be driven by this motor because of the irreversibility of the tangent wheel and endless screw mechanism coupled to said member.

To this end, safety means are advantageously provided comprising:

a truncated cone shaped ramp 37 provided on the body of the outwardly threaded part 26, a microswitch 38 whose mobile element is placed in the axial path of the truncated cone shaped ramp 37 so as to be actuated by this ramp at the beginning of the axial movement thereof to the right from its leftmost position shown in the FIGURE, and an electric circuit controlled by this microswitch and associated with a means of neutralizing the motor.

Following which, and whatever the embodiment adopted, a selective coupling device is finally obtained whose construction and operation follow sufficiently from what has gone before.

This device presents numerous advantages with respect to those known heretofore, more especially in so far as the ease of execution of the different manual controls is concerned, due in particular to the gearing down of the forces, the extended life of the mechanism, the safety of the controls provided, due more particularly to the irreversibility of the tangent wheel 22—endless screw 23 assembly.

In this connection, it may be noted that, in the preferred application mentioned above, it is possible to permute the mode of coupling of driven shaft 2 even when the propellor is driven in rotation, since at no time are hub 15, and so said shaft 2, uncoupled both from shaft 1 and from the irreversible assembly 22-23: consequently, at no time can there occur an undesirable modification of blade orientation, considering the irreversibility of the kinematic chain going from this blade to the drive members through said shaft 2.

As is evident, and as it follows moreover already from what has gone before, the invention is in no wise limited to those of its modes of application and embodiments which have been more especially considered; it embraces, on the contrary, all variations thereof, more particularly:

those where the connection between the threaded part 26 and the extension 20 of hub 15 are provided not by collar 24 on this extension and case 27 on this part, but on the contrary by a collar on said part and a case on said extension, those where the collar is axially surrounded by the case with an easy fit jointing contact without insertion of thrust bearings, those where the helical compression springs 33 are replaced by other resilient means leading to the same result, for example by resilient washers of the Belleville type or else by rubber studs.

I claim:

1. A device for selectively coupling to a shaft to be driven by two separate driving members, one of which is the output shaft of a motor and the other of which is a hand-driven operating member, comprising two coaxial inwardly splined ring-wheels which are axially contiguous and are integral respectively, a first ring-wheel being integral with the output shaft of the motor and a second ring-wheel being integral with the shaft to be driven, an outwardly splined hub adapted to coact with the two splined ring-wheels and means adapted to move axially this hub which remains always engaged with the second ring-wheel so as to couple it to the first ring-wheel or on the contrary to uncouple it therefrom, characterized in that it further comprises a third inwardly splined ring-wheel (16) which is similar to the first two ring-wheels (13,14) and is rotatably mounted in a frame (19) in a position axially contiguous to the second ring-wheel (14), on the side thereof opposite the first ring-wheel (13), a tangent wheel (22) integral with this third ring-wheel, an endless screw (23) coacting with the tangent wheel and actuatable by a first rotary manual control member, and screw means for controlling, from a second rotary manual control member, the axial sliding of the splined hub (15) so as to cause it to coact either with the first ring-wheel or with the third one.

2. The coupling device as claimed in claim 1, characterized in that the screw means for controlling the sliding of the hub (15) comprise an inwardly threaded sleeve (25) integral with the frame (19), an outwardly threaded part (26) coacting with the sleeve and ending on the outside of the frame in a head (28) adapted to receive rotary manual forces and means for making the threaded part integral axially, but not angularly, with the hub.

3. The coupling device as claimed in claim 2, characterized in that the means for making the outwardly threaded part (26) integral axially, but not angularly, with the hub (15) comprise a transverse collar (24) integral with this hub and a case (27) extending said outwardly threaded part and adapted to envelop therewith the collar with play radially but without play in the axial direction.

4. The coupling device as claimed in claim 3, characterized in that the thrust bearings (32) are inserted axially between the collar (24) and the transverse axially facing bearing surfaces of the case (27) and of the outwardly threaded part (26).

5. The coupling device as claimed in claim 3, characterized in that resilient means are inserted between the axially facing transverse bearing surfaces comprised respectively by the collar (24) and by the parts (26,27) which envelop it.

6. The coupling device as claimed in claim 4, characterized in that the resilient means are inserted between each thrust bearing (32) and one of the two bearing surfaces of the collar and of the assembly which surrounds it axially.

7. The coupling device as claimed in claim 5, characterized in that the resilient means are formed by a ring of helical compression springs (33) housed in appropriate pockets (34).

8. The coupling device as claimed in claim 2, characterized in that the threaded part comprises an annular truncated cone shaped ramp (37) or similar adapted to coact, during axial movement of this part, with a microswitch (38) mounted in an electric circuit itself associated with safety means adapted to neutralize the motor as long as the hub (15) is not in its axial position corresponding to total coupling thereof with the output shaft (1) of this motor.

* * * * *